(12) United States Patent
Barhorst et al.

(10) Patent No.: US 7,863,538 B2
(45) Date of Patent: Jan. 4, 2011

(54) METAL-CORE GAS METAL ARC WELDING OF FERROUS STEELS WITH NOBLE GAS SHIELDING

(75) Inventors: Steve Barhorst, Sidney, OH (US); Joseph Bundy, Piqua, OH (US); Daryl Duncan, Troy, OH (US)

(73) Assignee: Hobart Brothers Company, Troy, OH (US)

( * ) Notice: Subject to any disclaimer, the term of this patent is extended or adjusted under 35 U.S.C. 154(b) by 1410 days.

(21) Appl. No.: 10/804,913

(22) Filed: Mar. 19, 2004

(65) Prior Publication Data
US 2005/0205525 A1    Sep. 22, 2005

(51) Int. Cl.
*B23K 9/173* (2006.01)
(52) U.S. Cl. ....................................................... 219/74
(58) Field of Classification Search ............... 219/74, 219/137 R, 75
See application file for complete search history.

(56) References Cited

U.S. PATENT DOCUMENTS

| | | | | |
|---|---|---|---|---|
| 3,143,630 A | * | 8/1964 | Sohn et al. | ..................... 219/74 |
| 4,362,919 A | | 12/1982 | Miller et al. | |
| 4,463,243 A | * | 7/1984 | Church | ......................... 219/74 |
| 4,800,131 A | * | 1/1989 | Marshall et al. | ............. 428/558 |
| 4,871,898 A | | 10/1989 | Cherne et al. | |
| 5,857,141 A | | 1/1999 | Keegan et al. | |
| 6,303,891 B1 | * | 10/2001 | Gault | ........................... 219/74 |
| 6,723,954 B2 | * | 4/2004 | Nikodym et al. | .......... 219/130.1 |
| 2003/0136774 A1 | | 7/2003 | Nikodym et al. | |
| 2004/0256370 A1 | | 12/2004 | Keegan | |

FOREIGN PATENT DOCUMENTS

DE    19711955    10/1997
GB    791176    2/1958

OTHER PUBLICATIONS

European Search Report dated Jul. 4, 2005, from related European Application No. EP 05 25 0971.

* cited by examiner

*Primary Examiner*—Kevin P Kerns
(74) *Attorney, Agent, or Firm*—Houston Eliseeva, LLP (57) ABSTRACT

The gas-metal arc welding of metal-core wile electrodes in the pure Ar shielding gas for carbon steel, low alloy steel, and ferritic stainless steel is described. Such shielding gas provides several benefits not realized ??the gas-metal arc welding process with solid wires. When compared to standard argon/oxygen containing gas mixtures normally used for metal cored wires, these benefits include reduced silicate islands on the weld surface for improved weld appearance, reduced welding fume, and lower weld spatter, all of which provide easier clean-up after the welding operation. Benefits also include reduced arc penetration desirable for welding on thinner materials or handling poor joint fit-up. Lower voltage requirement further makes it possible to weld on thinner materials. Lower oxygen content in the weld deposits provide better toughness and easier welding in all-positions.

7 Claims, 12 Drawing Sheets

FIG. 1

```
Test Number --- 2797D-2-001A

Specimen Number -- P23222
Charpy V-Notch Toughness Using 100% Argon Shielding
Temperature, Degrees F     0    0    0    0    0   -20  -20  -20  -20  -20
Foot Pounds               71   61   57   65   50    41   47   50   53   56
Oxygen In Weld Deposit = .05220

Specimen Number -- P23225
Charpy V-Notch Toughness Using 90% Argon & 10% CO2 Shielding
Temperature, Degrees F     0    0    0    0    0   -20  -20  -20  -20  -20
Foot Pounds               39   54   28   50   40    31   38   35   28   32
Oxygen In Weld Deposit = .05920
```

Fig. 2

Untitled
FUME CHAMBER TESTING

DATE 08/28/2003      SPEC NO F11649         TYPE
SIZE .052  CLASS              CO/LOG                PROJ#
SHEET/DEV          TEST/SER  27970-1-001        WELDED BY  KEB
FM SPEC                 ENGR  DLD              CURRENT  DCEP
WFS  338    AMPS  300    VOLTS 25.0   ESO 1.000    GAS  ARGON
ELECTRODE ANGLE  90    TRAVEL (IPM)  14.0    DURATION (MIN)  0.50
AIR FLOW (CFH)  45.00                   MATERIAL TYPE   W

FOLLOWING RESULTS ARE AN AVERAGE OF THREE TESTS
% FUME   0.23     FGR (GMS/MIN)  0.20    MELT RATE (LB/HR)  11.62

Fig. 3

Untitled
FUME CHAMBER TESTING

| | | | |
|---|---|---|---|
| DATE 08/28/2003 | SPEC NO F11650 | TYPE | |
| SIZE .052 CLASS | CO/LOG | PROJ# | |
| SHEET/DEV | TEST/SER 2797D-1-001 | WELDED BY KEB | |
| FM SPEC | ENGR DLD | CURRENT DCEP | |
| WFS 338 AMPS 300 | VOLTS 25.0 | ESO 1.000 | GAS 90/10 |
| ELECTRODE ANGLE 90 | TRAVEL (IPM) 14.0 | DURATION (MIN) 0.50 | |
| AIR FLOW (CFH) 45.00 | | MATERIAL TYPE W | |

FOLLOWING RESULTS ARE AN AVERAGE OF THREE TESTS

% FUME 0.64     FGR (GMS/MIN) 0.55     MELT RATE (LB/HR) 11.35

Fig. 12

METAL-CORE GAS METAL ARC WELDING OF FERROUS STEELS WITH NOBLE GAS SHIELDING

FIELD OF THE INVENTION

The present invention relates generally to gas-metal arc welding of carbon steel, low alloy steel and ferritic stainless steel. More particularly, the present invention relates to the process of gas-metal arc welding of carbon steel, low alloy steel and ferritic stainless steel in which a shielding gas is a non-oxidizing noble gas or a mixture of noble gases.

BACKGROUND OF THE INVENTION

Figure 1:
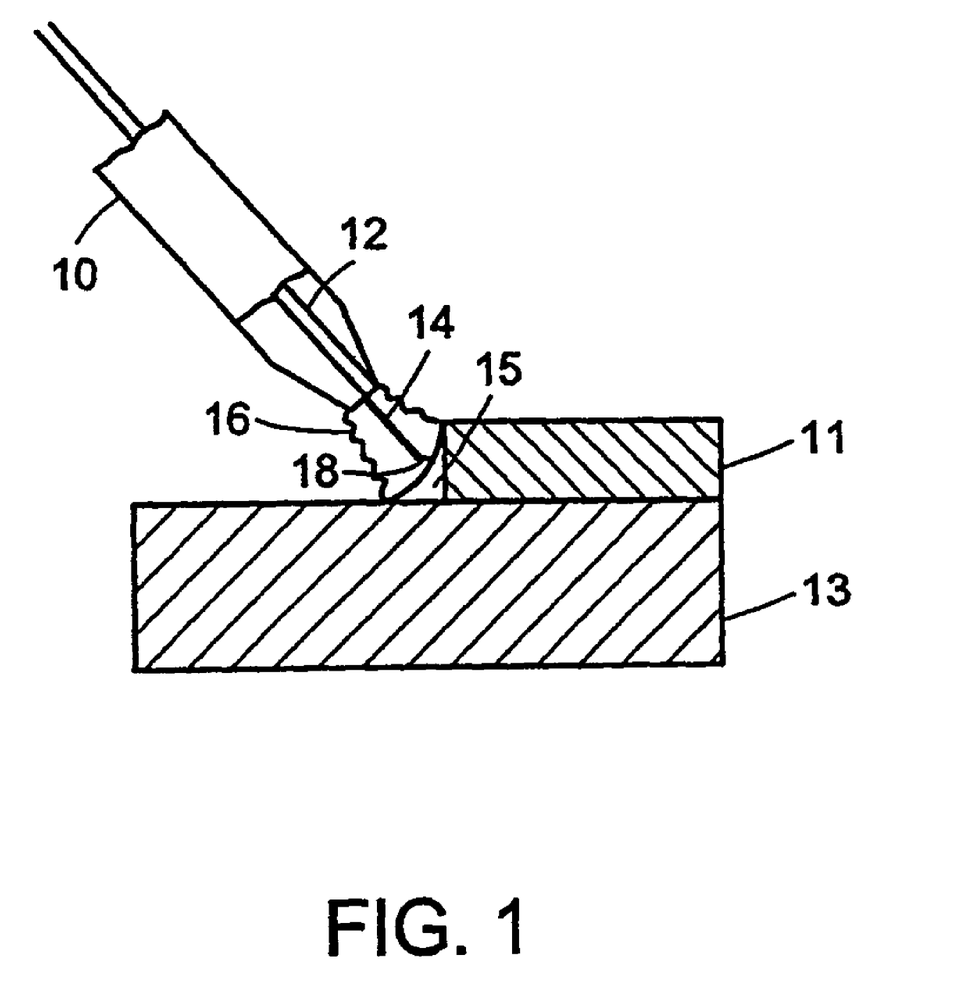
FIG. 1 is a schematic illustration of a gas-metal arc welding apparatus.

Gas metal arc welding (GMAW) is a welding process in which an electrical arc between a filler metal and a work piece heats the filler metal and the work and welds them together. The filler metal is usually a consumable electrode which is fed into the process as fast as it is consumed. The electrical arc is formed between the tip of the consumable electrode and the metal of the work piece. The GMAW welding process can be used to join two pieces of sheet metal together, as well as in many other applications. An example of a welding gun and an arrangement for GMAW is schematically shown in FIG. 1. A consumable welding electrode 14 is fed into the welding process through a welding gun 10. Electrode 14 is melted by an electrical arc 18 established between the electrode and the work piece consisting of metal sheets 11 and 13. The welding process is usually performed in the shielding atmosphere of externally supplied gas, such as Ar, $CO_2$, and their mixtures, which enters the welding process through a gas nozzle 12 in welding gun 10 and shields the arc, the tip of the electrode and the pool of molten metal 15 by forming a gas shield 16. The advantages of the GMAW process is the high quality weld that can be produced faster and with very little spatter and loss of alloying elements due to the gas shield and a stable electrical arc.

Solid and metal-core wire electrodes are commonly used in gas-metal arc welding, because they produce high strength welds in a single or multi pass process at high welding speeds. Such weld wires are formulated to form a solid, nonporous weld bead with a good tensile strength, ductility and impact strength to meet the requirement of the desired end use application. Solid and metal-cored wires are also formulated to minimize slag formation, although small slag islands or a thin line of slag often remain at the weld toe in the traditional gas-metal arc welding process. The slag lines or islands have to be removed before painting or coating, otherwise they will eventually peel off after coating, exposing the metal to ambient air, facilitating corrosion and detrimentally affecting the appearance of a piece.

Solid wires are considered to be some of the most popular types of welding wires. Continuous welding made possible by solid wire leads to a higher productivity compared to shielded metal arc welding with a consumable stick electrode. Solid wires are made by drawing a hot rolled rod of a specific chemistry to a desired diameter. Solid wires are then cleaned and copper plated, if necessary. Mn and Si present in a solid wire oxidize during the welding process and produce isolated, thin slag islands. The productivity advantages of solid wires are sometimes offset by the time required to remove the slag deposits or islands that form on the surface of the weld.

Metal-core wire electrodes are increasingly used as an alternative to solid weld wires for improved productivity in structural fabrication. Metal-core weld wires are composite tubular filler metal electrodes having a metal sheath and a core containing a composition of various powdered materials. The core composition of metal-core wires includes iron powder, usually as filler material. The core composition comprises approximately 1 to 45% of the total wire weight. The iron powder content is usually considerable and comprises generally between approximately 0 and 44% of the total wire weight. During the manufacture of metal-core wires, the core composition is blended and deposited onto a steel strip, which is formed into a tube or sheath about the core composition in a forming mill. The steel sheath surrounding the core composition is then drawn through reducing dies to a specified diameter. Metal-core wires provide increased weld deposition rates and produce wider and more consistent penetration profiles than solid wires. In addition, metal-core wires generate less spatter, provide improved arc stability, and produce weld deposits with improved wetting characteristics and gap-bridging capabilities in comparison to solid wires. However, these productivity advantages which metal-core wires provide are sometimes offset by the time required to remove the slag deposits or islands which form on the surface of the weld.

When a gas-metal arc welding process with a solid wire is used for welding ferrous alloys, it is known and customary in the welding industry that the shielding gas always consists of a mixture of Ar and a certain percentage of $CO_2$ and/or $O_2$. The additions of active gases, such as $CO_2$, $O_2$, to inert noble gas Ar (and sometimes He) for gas-metal arc welding of ferrous alloys are considered to be necessary to stabilize the erratic arc, achieve better penetration and a better weld bead wetting in spite of their causing excessive welding fuming and their detrimental effect on mechanical properties of the weld. Such deterioration of mechanical properties is caused by active gases $CO_2$ and/or $O_2$ forming oxide inclusions in the weld metal. Silicon islands usually have to be removed from the weld surface prior to any painting or coating operation, which leaves a visible mark or scar on the weld.

The mechanical properties of the weld of ferrous alloys, as well as improvements of the welding conditions, would be desirable, if the detrimental oxidizing effect of active gases in the shielding mixture could be reduced without destabilizing the arc.

SUMMARY OF THE INVENTION

Throughout the description of the present invention, the term "pure Ar" or "pure noble gas" or "pure inert gas" or "100% Ar" should be understood to mean commercially available degree of purity, which could be, for example, 99.9%, 99.99%, 99.97% and similar percentages, up to 100%. It is helpful to illustrate what compositions of the shielding gas are considered to be "noble gases" as contemplated by the present invention. In the case of less than 100% pure Ar, or "pure noble gas", the shielding gas mixture can have up to 2% of $N_2$ or $N_2O_5$. It is also contemplated by the present invention that residual amounts (up to 1%) of oxidizing gases can remain in the noble gas shielding mixture.

The invention makes it possible to weld carbon steel, low alloy steel and ferritic stainless steel in a gas-metal arc welding process by utilizing a metal-core consumable electrode in a pure noble gas shielding atmosphere (such as, for example, Ar or He or mixtures of noble gases). Replacing the Ar/$CO_2$ or Ar/$O_2$ mixture with pure Ar shielding gas (pure inert single element gas) during the welding of ferrous alloys with the metal core wires greatly reduces the amount of slag that ordinarily forms on the weld bead surfaces. A metal-core wire electrode is used to overcome the gas-metal arc welding process arc instability and maintain a good bead wetting quality in welding ferrous alloys. The metal cored wires can be selected according to the industry standards defined in AWS A5.18, AWS A5.28, and AWS A5.9.

A gas-metal arc welding of ferrous alloys, such as carbon steel, low alloy steel and ferritic stainless steel, comprises feeding a consumable metal-core electrode into a gas-metal arc welding apparatus. The metal-core electrode is of a conventional structure, which is a sheath and a core characterized by a core composition. The process uses a noble shielding gas to form a noble shielding atmosphere around the consumable metal-core electrode. When the arc is ignited between a ferrous alloy work piece and the consumable metal-core electrode, the metal-core electrode melts to form a weld on the work piece. The described method with a carbon steel electrode allows a welder to weld a ferrous metal work piece to obtain a percentage of oxygen in a weld metal not exceeding 0.06% wt., as well as to reduce a fume generation rate to 0.25 gms/min or lower. The described method provides for a very stable arc characterized by a a standard deviation within the range from about 0.2 V to about 0.3 V. The produced welds were characterized by a toughness of a weld metal at 0 F of at least about 50 ft-lb at 0° F. and at least about 41 ft-lb at −20° F.

One of the main advantages provided by the present invention for welding ferritic stainless steels is reduced penetration. Such materials as tubing for automotive parts, for example, exhaust manifolds, catalytic converters, mufflers usually have thin walls. Reduced penetration allows such materials to be welded without burning through the thin walls and damaging the parts.

DETAILED DESCRIPTION

The metal-core wires used in the gas-metal arc welding of ferrous alloys in the pure inert gas shielding atmosphere comprise low carbon metal-core wires, stainless steel metal-core wires, low alloy metal cored wires and others.

Low carbon metal-core wires have generally the following wire composition, between the approximate ranges, by total weight of the wire:

TABLE 1

Low carbon metal-core wire composition

| Wire | Embodiment 1 | Embodiment 2 |
|---|---|---|
| C | 0.005-0.150% | 0.005-0.040% |
| Mn | 0.5-2.5% | 1.4-1.8% |
| Si | 0.2-1.2% | 0.8-1.2% |
| Ti | 0.001-0.100% | — |
| B | 0.0001-0.0200% | — |
| $O_2$ (ppm) | 100-500 | 200-400 |
| Fe | Balance | Balance | wherein the core composition includes, between the approximate ranges, by total weight of the wire:

TABLE 2

Core composition of a low carbon metal-core wire as a percentage of the total electrode.

| Core | Embodiment 1 | Embodiment 2 |
|---|---|---|
| Mn | 0.1-2.5% | 1.40-1.80% |
| Si | 0.2-2.0% | 0.8-1.2% |
| Ti | 0.001-0.100% | — |
| B | 0.0001-0.0200% | — |
| Fe | 0.2-10.0% | 1.5-2.5% |
| Fill % | 0.001-12% | 2.5-6.0% | and the steel sheath includes, between the approximate ranges, by total weight of the wire:

TABLE 3

Sheath composition of a low carbon metal-core wire

| Sheath | Embodiment 1 | Embodiment 2 |
|---|---|---|
| C | 0.005-0.150% | 0.005-0.040% |
| Mn | 0.1-1.1% | 0.2-0.4% |
| Ti | 0.001-0.100% | — |
| B | 0.0001-0.0200% | — |
| Fe | Balance | Balance |

Ferritic stainless steel metal-core wires have generally the following wire composition, between the approximate ranges, by total weight of the wire:

TABLE 4

Stainless steel metal-core wire composition

| Wire | Embodiment 1 | Embodiment 2 | Embodiment 3 |
|---|---|---|---|
| C | 0.01-0.30% | 0.01-0.04% | 0.01-0.04 |
| Mn | 0.2-1.0% | 0.3-1.0% | 0.3-1.0% |
| Si | 0.1-1.0% | 0.1%-0.8% | 0.1-0.8% |
| Cr | 10.5-20.0% | 10.5-13.5% | 15-20% |
| Ni | 0.01-1.0% | 0.01-0.4% | 0.01-0.4% |
| Ti | 0.001%-1.5% | 0.40-1.50% | 0.4-1.5% |
| Nb | 0.01-1.0% | 0.01-0.20% | 0.01-0.20% |
| $O_2$ (ppm) | 100-1000 | 300-800 | 300-800 |
| Fe | Balance | Balance | Balance | wherein the core composition includes, between the approximate ranges, by total weight of the wire:

TABLE 5

Core composition of a stainless steel metal-core wire wire as a weight percentage of the total electrode.

| Core | Embodiment 1 | Embodiment 2 | Embodiment 3 |
| --- | --- | --- | --- |
| Mn | 1.0-2.0% | 0.3-0.8% | 0.2-0.8% |
| Si | 0.3-2.5% | 0.1-0.3% | 0.1-0.8% |
| Cr | 10.5-20.0% | 10.5-13.5% | 15.0-20.0% |
| Ni | 0.01-1.0% | 0.01-0.4% | 0.01-0.4% |
| Ti | 0.01-1.5% | 0.4-1.5% | 0.4-1.5% |
| Nb | 0.01-1.0% | 0.01-0.2% | 0.01-0.4% |
| Fe | 0.01-2.0% | 0.3-1.5% | 0.3-1.5% |
| Fill % | 0.001-30% | 11.0-18% | 16-23% | and the steel sheath includes, between the approximate ranges, by total weight of the wire:

TABLE 6

Sheath composition of a ferritic stainless steel metal-core wire

| Sheath | Embodiment 1 | Embodiment 2 | Embodiment 3 |
| --- | --- | --- | --- |
| C | 0.005-0.150% | 0.005-0.040% | 0.005-0.040% |
| Mn | 0.1-1.1% | 0.2-0.4% | 0.2-0.4% |
| Ti | 0.001-0.100% | — | — |
| B | 0.0001-0.0200% | — | — |
| Fe | Balance | Balance | Balance |

Low alloy metal-core wires have generally the following wire composition, between the approximate ranges, by total weight of the wire:

TABLE 7

Low alloy metal-core wire composition

| Wire | Embodiment 1 | Embodiment 2 |
| --- | --- | --- |
| C | 0.005-0.15% | 0.07-0.10% |
| Mn | 0.5-2.5% | 1.00-1.30% |
| Si | 0.2-1.2% | 0.40-0.80% |
| Cr | 0.01-9.0% | — |
| Ni | 0.01-9.0% | 3.00-3.30% |
| Ti | 0.001-0.100% | — |
| Mo | 0.01 5.0% | — |
| B | 0.0001-0.0200% | — |
| $O_2$ (ppm) | 100-500 | 200-400 |
| Fe | Balance | Balance | wherein the core composition includes, between the approximate ranges, by total weight of the wire:

TABLE 8

Core composition of a low alloy metal-core wire

| Core | Embodiment 1 | Embodiment 2 |
| --- | --- | --- |
| C | 0.005-0.030% | 0.015-0.045% |
| Mn | 0.5-2.5% | 0.50-0.80% |
| Si | 0.2-1.2% | 0.50-0.70% |
| Cr | 0.01-9.0% | — |
| Ni | 0.01-9.0% | 3.0-3.3% |
| Ti | 0.001-0.100% | — |
| Mo | 0.01-5.0% | — |
| B | 0.001-0.020% | — |
| Fe | 0.1-10.0% | 1.0-2.0% |
| Fill % | 0.001-30% | 2.5-6.0% | and the steel sheath includes, between the approximate ranges, by total weight of the wire:

TABLE 9

Sheath composition of a low alloy metal-core wire

| Sheath | Embodiment 1 | Embodiment 2 |
| --- | --- | --- |
| C | 0.005-0.15% | 0.03-0.05% |
| Mn | 0.2-1.5% | 0.2-0.6% |
| Fe | Balance | Balance |

Another metal-core wire composition, between the approximate ranges, by total weight of the wire that can be used with the gas-metal arc welding of ferrous alloys in the 100% inert gas shielding atmosphere, is provided in Table 10:

TABLE 10

Metal Core Wire Composition

| | Weight Percentage Range | | |
| --- | --- | --- | --- |
| Element | Generally | Mild Steel | Low Alloy |
| C | 0.0-0.13 | 0.0-0.12 | 0.0-0.13 |
| Mn | 0.0-3.5 | 0.0-3.5 | 0.0-3.5 |
| Si | 0.0-2.0 | 0.0-2.0 | 0.0-2.0 |
| Cr | 0.0-10.5 | 0.0-0.5 | 0.0-10.5 |
| Ni | 0.0-3.75 | 0.0-0.5 | 0.0-3.75 |
| Ti | 0.0-0.1 | 0.0-0.1 | 0.0-0.1 |
| Mo | 0.0-1.2 | 0.0-0.5 | 0.0-1.2 |
| B | 0.0-0.1 | 0.0-0.1 | 0.0-0.1 |
| V | 0.0-0.25 | 0.0-0.5 | 0.0-0.25 |
| Sb/Bi/Ge | 0.04-0.3 | 0.04-0.3 | 0.04-0.3 |
| Fe | 85.6-99.25 | 96.25-99.25 | 85.6-99.0 |

In the presented tables elemental percentages are reported to within one-hundredth of a percent, however, those skilled in the art will recognize that these percentages reflect industry standards and are not a technical limit on the invention. Sb, Bi and Ge can be used in combination or in the alternative. Sb is the preferred additive. In the most typical embodiments, the wire (and weld bead) contains a minimum of 0.5% Mn and a minimum of 0.2% Si. Typically the wire (and weld bead) will contain a minimum of 0.003% carbon. Industry standards for mild and low alloy steel limit the combined amount of Cr, Ni, Mo, V, Ti, B, Sb, Bi, and Ge to less than 0.5%. Higher amounts can be used but industry standards would not be satisfied.

Analysis of welds in accordance with the invention has shown that the alloy additions reside in the weld as opposed to the slag islands leading to the conclusion that in the case of metal core wire, the metal additions can be made to the sheath or the core. As a matter of convenience, the additions are generally made to the core. Core and sheath compositions by total weight of the wire for metal core wires are provided in Table 11 and Table 12:

TABLE 11

Core Composition for Metal Core Wires

| | WEIGHT PERCENT RANGES | | |
| --- | --- | --- | --- |
| ELEMENT | Generally | Mild Steel | Low Alloy |
| C | 0.0-0.13 | 0.0-0.12 | 0.0-0.13 |
| Mn | 0.0-3.5 | 0.0-3.5 | 0.0-3.5 |
| Si | 0.0-2.0 | 0.0-2.0 | 0.0-2.0 |
| Cr | 0.0-10.5 | 0.0-0.5 | 0.0-10.5 |

TABLE 11-continued

Core Composition for Metal Core Wires

| | WEIGHT PERCENT RANGES | | |
|---|---|---|---|
| ELEMENT | Generally | Mild Steel | Low Alloy |
| Ni | 0.0-3.75 | 0.0-0.5 | 0.0-3.75 |
| Ti | 0.0-0.1 | 0.0-0.1 | 0.0-0.1 |
| Mo | 0.0-1.2 | 0.0-0.5 | 0.0-1.2 |
| B | 0.0-0.1 | 0.0-0.1 | 0.0-0.1 |
| V | 0.0-0.25 | 0.0-0.5 | 0.0-0.25 |
| Sb/Bi/Ge | 0.04-0.3 | 0.04-0.3 | 0.04-0.3 |
| Fe | 0.0-44.0 | 0.0-44.0 | 0.0-44.0 |

TABLE 12

Sheath Composition:

| | Weight Percentage Ranges | | |
|---|---|---|---|
| Element | Generally | Mild Steel | Low Alloy |
| C | 0.0-0.13 | 0.0-0.12 | 0.0-0.13 |
| Mn | 0.0-3.5 | 0.0-3.5 | 0.0-3.5 |
| Si | 0.0-2.0 | 0.0-2.0 | 0.0-2.0 |
| Sb/Bi/Ge | 0.04-0.3 | 0.04-0.3 | 0.04-0.3 |
| Fe | 55.25-99.25 | 55.25-99.25 | 55.0-99.0 |

The antimony can be added to the core as the elemental metal or as a compound or alloy such as $Sb_2S_3$; $SbF_3$; $Sb_2(SO_4)_3$; or $Sb_2O_3$. Bismuth can be added as the metal, as $(BiO)_2CO_3$, $Mn_2Bi_3$, or $Bi_4Ge_3O_{12}$. Germanium can be added as the metal or as the foregoing compound with bismuth. The oxides of antimony can be added to the metal powder. Slag is made up of oxides. In order to reduce the amount of slag, it is common practice that the amount of oxides in the core composition is held to a minimum. The slag-modifying additive is preferably incorporated in the core composition in an amount of about 0.3 to 2.0 wt. % (0.04 to 0.3 wt. % of the wire). Typically these materials are added in an amount of about 0.04 to 0.3% based on the total weight of the wire and preferably 0.14 to 0.21%.

Any of the following (but not limited to) commercially available carbon steel and low alloy steel metal core wires can be modified to include antimony, bismuth and/or germanium as described herein. The following tables 13 and 14 represent these products and their typical deposit chemistry.

TABLE 13

| Carbon Steel | | | | | | | |
|---|---|---|---|---|---|---|---|
| Metalloy ® Product | AWS Class | C | Mn | Si | P | S | Fe |
| 70 | E70C-6M | .06 | 1.39 | .70 | .011 | .014 | Bal. |
| 71 | E70C-6M | .09 | 1.47 | .70 | .008 | .013 | Bal. |
| 70X | E70C-6M | .04 | 1.50 | .70 | .008 | .013 | Bal. |
| 76 | E70C-6C | .09 | 1.29 | .61 | .010 | .016 | Bal. |
|  | E70C-6M | .05 | 1.56 | .75 | .009 | .013 |  |
| 70R | E70C-6C | .06 | 1.62 | .63 | .011 | .016 | Bal. |
|  | E70C-6M | .09 | 1.67 | .67 | .012 | .018 |  |
| Galvolloy ® | E70C-GS | .03 | .50 | .30 | .015 | .015 | Bal. |

TABLE 14

| Low Alloy Steel | | | | | | | | |
|---|---|---|---|---|---|---|---|---|
| Metalloy ® Product | AWS Class | C | Mn | Si | Ni | Cr | Mo | Cu | Fe |
| 80B2 | E80C-B2 | .07 | .78 | .42 |  | 1.25 | .47 |  | Bal. |
|  |  | .06 | .82 | .29 |  | 1.36 | .50 |  |  |
| 80D2 | E90C-G | .10 | 1.27 | .30 | .01 |  | .49 | .05 | Bal. |
|  |  | .08 | 1.94 | .66 | .02 |  | .50 | .02 |  |
| 80N1 | E80C-Ni1 | .05 | 1.11 | .36 | .88 |  | .13 |  | Bal. |
|  |  | .05 | .86 | .21 | .97 |  | .14 |  |  |
| 80N2 | E80C-Ni2 | .06 | 1.16 | .37 | 2.42 |  |  |  | Bal. |
|  |  | .03 | .77 | .28 | 2.23 |  |  |  |  |
| 80W | E80C-G | .04 | 1.19 | .63 | .61 | .55 |  | .54 | Bal. |
| 90 | E90C-G | .05 | 1.32 | .33 | 1.89 |  | .37 |  | Bal. |
|  |  | .03 | 1.30 | .28 | 1.72 |  | .41 |  |  |
| 90B3 | E90C-B3 | .09 | .62 | .39 |  | 2.07 | 1.01 |  | Bal. |
|  |  | .07 | .70 | .35 |  | 2.30 | 1.00 |  |  |
| 110 | E110C-G | .07 | 1.63 | .48 | 2.22 | .21 | .59 |  | Bal. |

With regard to the above-described metal-core wires, it has been discovered, replacing the $Ar/CO_2$ or $Ar/O_2$ mixtures with pure inert (noble) single element gas, such as, for example, Ar when welding ferrous alloys provides for a very stable arc and greatly reduces the amount of slag on the weld bead surfaces. A mixture of noble gases also can be used as a shielding atmosphere. A noble gas mixture, as used in the present invention, refers to exemplary compositions presented in Table 15 presented below. Table 15 illustrates possible noble gas mixture compositions, comprising noble gases only, or a noble gas with a residual amount of nitrogen or an oxidizing gas.

TABLE 15

Noble Gas Compositions

| | Noble Gases | | | Nitrogen Bearing gases | | Oxidizing gases | |
|---|---|---|---|---|---|---|---|
| | Ar | He | Ne, Rd, or Xe | $N_2$ | $N_2O_5$ | $O_2$ | $CO_2$ |
| 1 | 100% | — | — | — | — | — | — |
| 2 | 0-100% | 0-100% | — | — | — | — | — |
| 3 | 0-100% | 0-100% | 0-100% | — | — | — | — |
| 4 | 99.1-100% | — | — | — | — | <1.0% | — |
| 5 | 98-100% | — | — | — | — | — | <2% |
| 6 | 99-100% | — | — | — | <1% | — | — |
| 7 | 98-100% | — | — | <2% | — | — | — |
| 8 | | 98-100% | — | — | <2% | — | — |
| 9 | | 99-100% | — | — | — | — | <1% |
| 10 | | 97-100% | — | — | <2% | — | <1% |

The preferred shielding gas is composition #1, where 100% represents commercially available pure Ar. Other gas compositions in Table 15 listed as 100% pure to commercially available concentrations of those gases, which typically contain up 0.1% of impurities. It has been discovered during the test welding runs that high purity noble gases presented in table 15 perform very well and that additional costs of using a 100% pure noble gas are not usually warranted, for they don't lead to significantly better welding results. It also should be understood that the noble gas mixtures or single element noble gases containing residual amounts of $O_2$ or $CO_2$, as shown in Table 15, are considered to be "non-oxidizing" for the purposes of describing the present invention.

The difference between metal-core and solid wires was that the metal-core wire has an extremely stable arc and much better bead profiles. The inventors believe, without intending to be limited to any particular explanation theories, that this difference can be attributed to the inherently higher oxygen content of the metal-core wire. The amount of oxygen contained in the metal-core wire is sufficient to improve arc characteristics and a bead profile, but low enough to dramatically reduce slag formation. In addition, the reduction in oxidation of the bead surface produces a cleaner, brighter and a more aesthetically pleasing weld metal.

Figure 2:
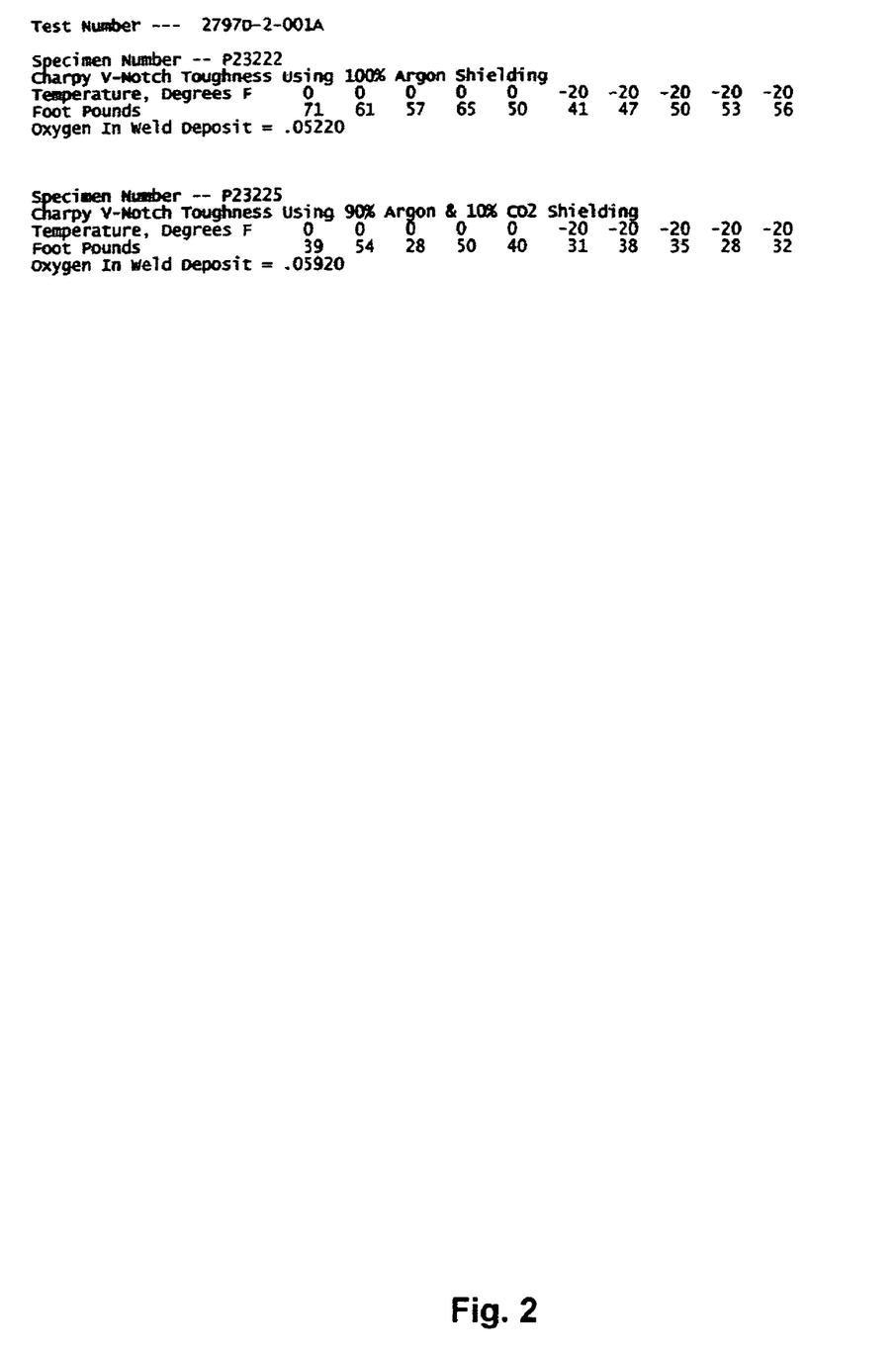
FIG. 2 shows the Charpy V-Notch toughness test results.

Turning now to FIG. 2, illustrated there are the representative results of the Charpy V-Notch toughness tests together with the test of the oxygen content in the resulting weld deposits. The results are provided for the gas-metal arc welding with a metal-core wire electrode in the 100% Ar shielding atmosphere and in the 90% Ar/10% $CO_2$ shielding atmosphere. The tests show that the weld produced in a pure Ar shielding atmosphere yields better toughness with the lower oxygen content in the weld deposit (at least about 50 ft-lb at 0° F. and at least 41 ft-lb at −20° F., the content of oxygen in the weld deposit for the pure Ar welding about 0.05% wt).

Moreover, high levels of oxygen in the weld metal reduce the toughness of the deposit, so the inventive welding process producing lower oxygen concentrations in the weld becomes attractive for applications, such as high strength pipeline welding and others. The oxygen levels in the weld deposits made by welding a matel-core wire in Ar shielding were found to approach those found in weld deposits made by welding a solid wire in 100% Ar.

Figure 3:
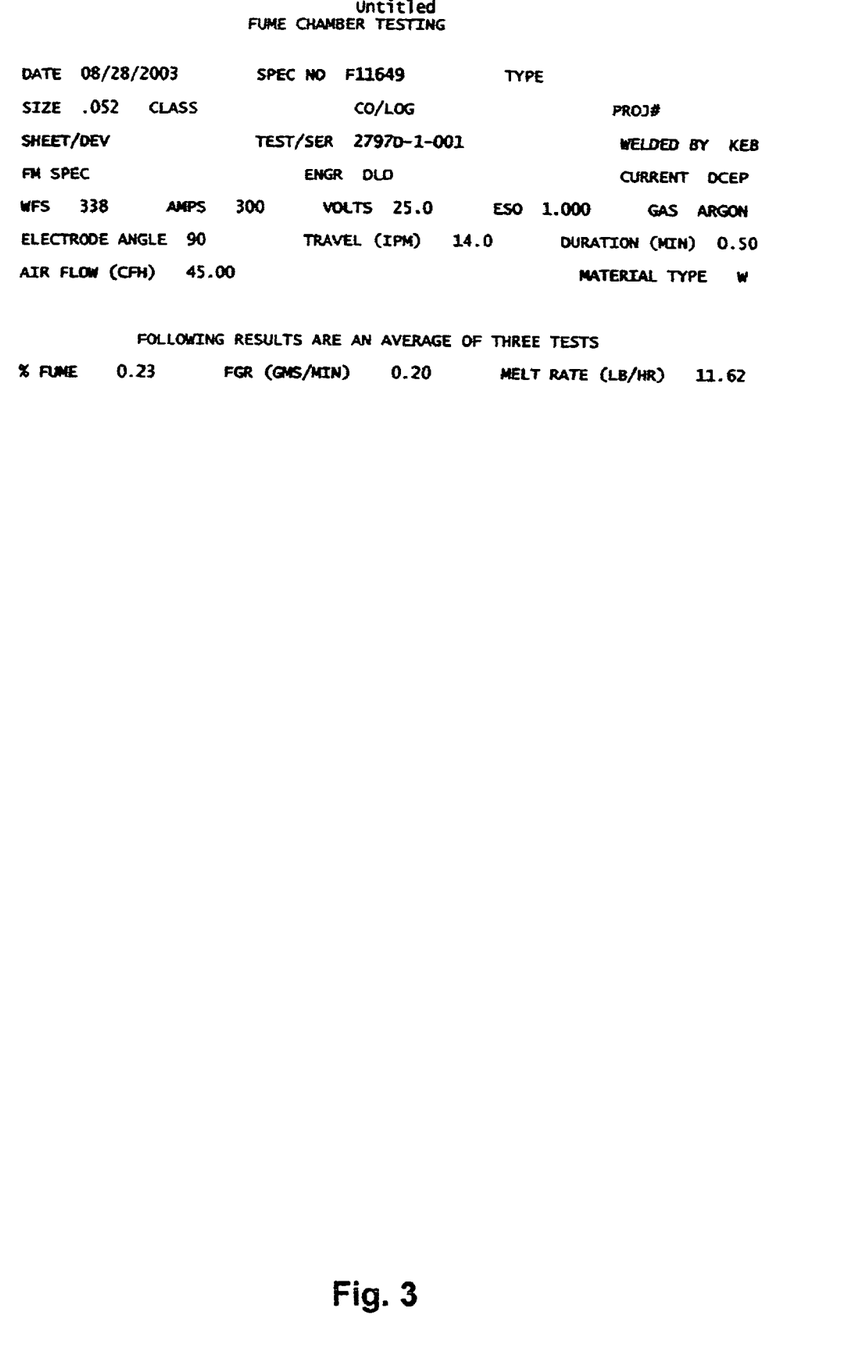
FIGS. 3-4 show the fume chamber test results.
Figure 4:
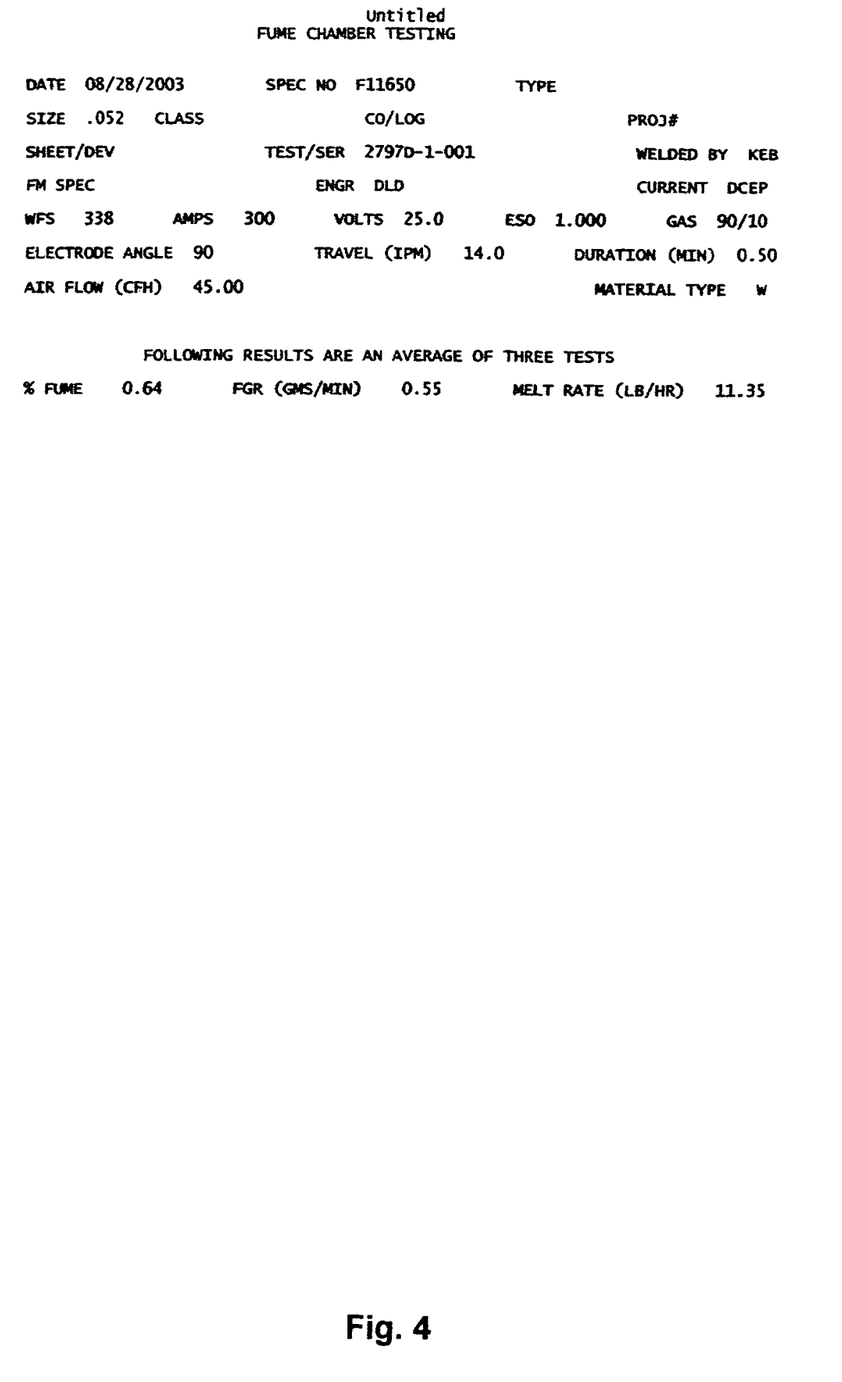

The illustrative fume chamber testing results are presented in FIG. 3 for the 100% Ar shielding atmosphere and in FIG. 4 for the 90% Ar/90% $CO_2$ shielding atmosphere. As follows from FIGS. 3-4, the fume generation rate was more than twice lower in the gas-metal arc welding of ferrous alloys with a metal-core wire under the same test conditions in the Ar shielding atmosphere as opposed to the 90% Ar/10% $CO_2$ shielding atmosphere (0.2 gms/min compared to 0.55 gms/min). These results show that the welding process according to the present invention is characterized by a significantly reduced welding fume generation. The welding fume particulate also needs to be removed from the weld before painting or coating operations, so a reduction in welding fume generation alleviates that problem.

Figure 5:
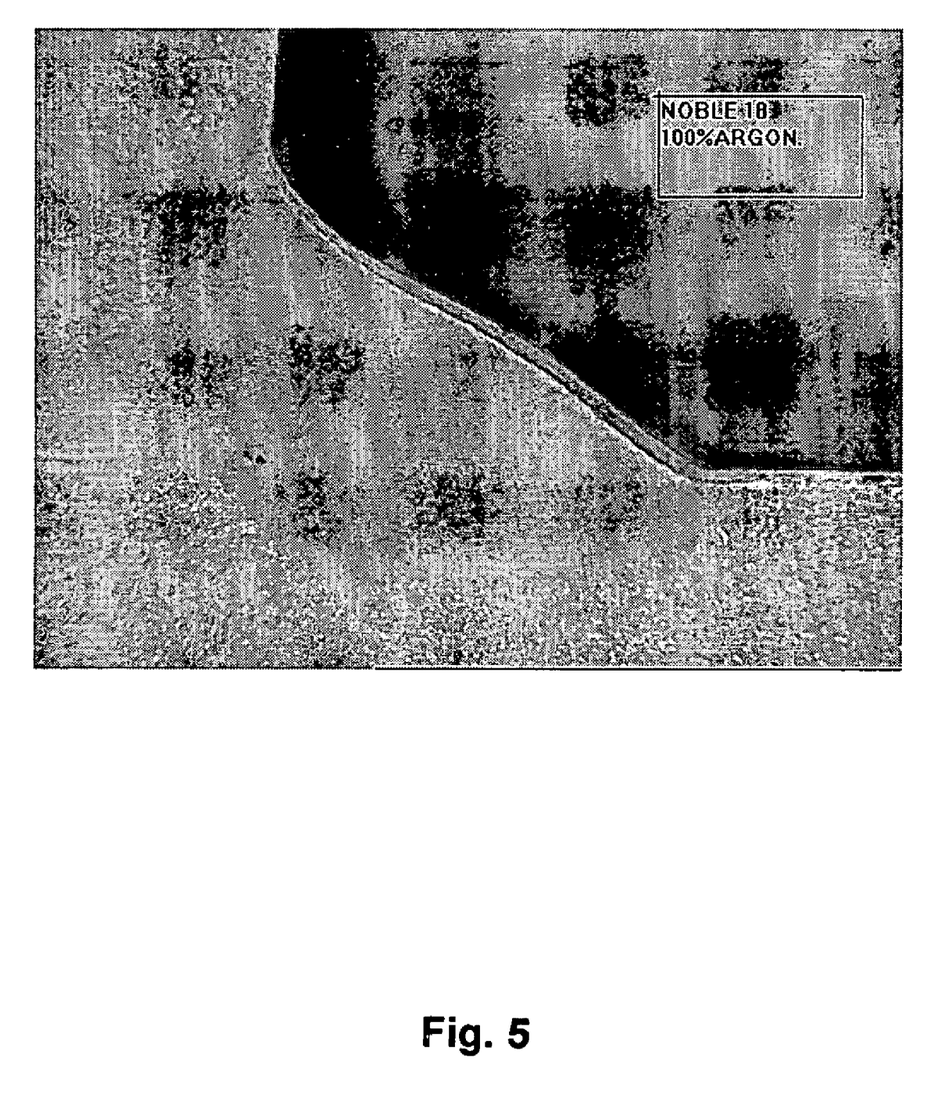
FIG. 5 is a cross sectional view of a metal-core wire weld made in pure Ar.
Figure 6:
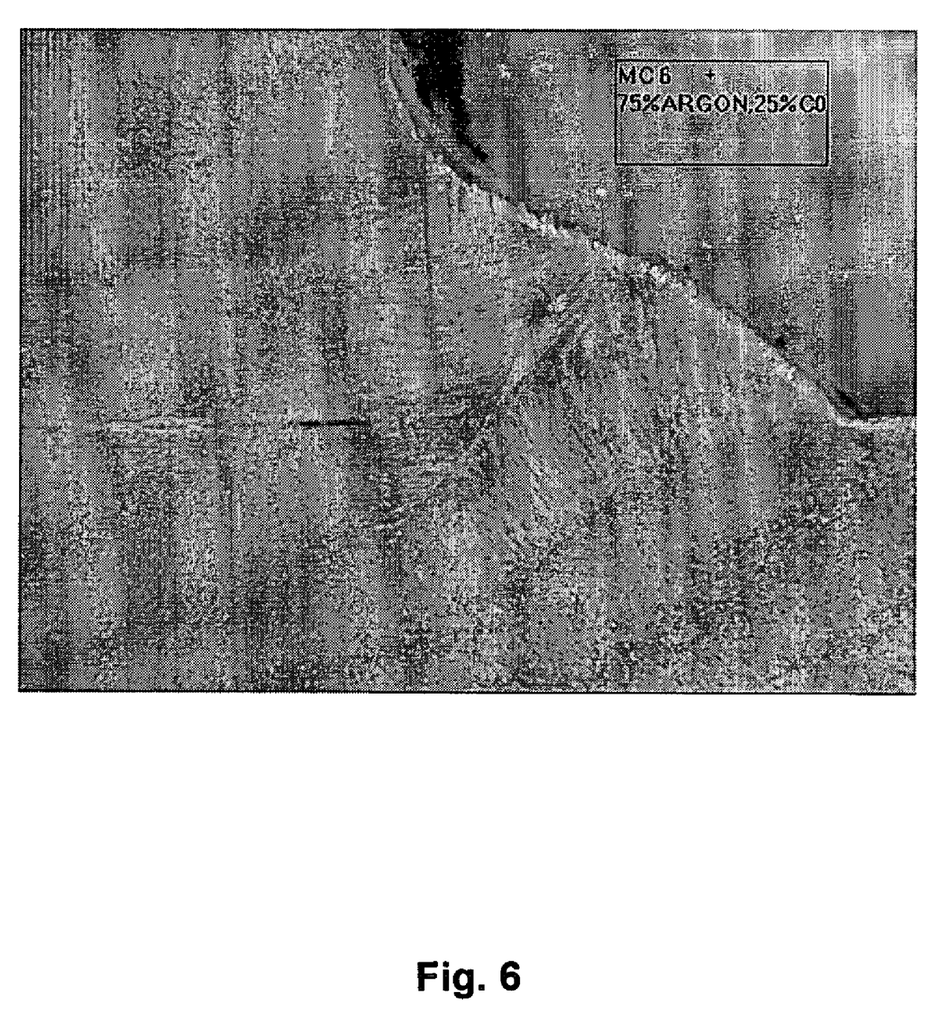
FIG. 6 is a cross-sectional view of a metal-core wire weld made in 75% Ar/25% $CO_2$.
Figure 7:
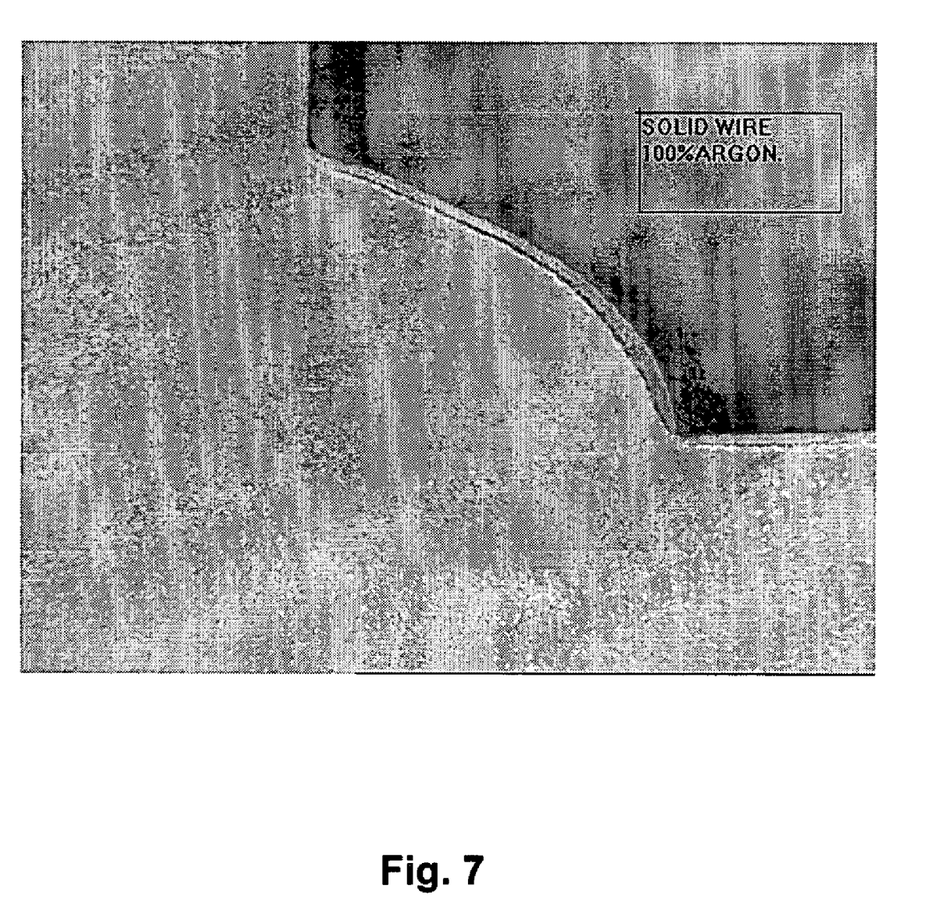
FIG. 7 is a cross-sectional view of a solid wire weld made in pure Ar.

Shown in FIG. 5-7 are the cross sections of the welds produced by welding a metal-core wire in different shielding atmospheres, showing the differences in arc penetration. The weld in FIG. 5 was produced by a metal-core weld wire weld in 100% Ar. The weld in FIG. 6 was produced by welding a metal-core wire in 75% Ar/25% $CO_2$. The weld in FIG. 7 was produced by welding a solid wire in 100% Ar shielding. The weld produced by welding a metal-core wire in the Ar atmosphere (FIG. 5) shows a lower arc penetration when compared to the weld produced by a metal-core wire weld with oxygen in the shielding gas and the weld produced by a solid wire in Ar. The lower arc penetration in the metal-core wire weld in pure Ar process provide a capability for welding thinner plates without the danger of burning through the thin plates and damaging the work piece. Since metal-core wires are often used in robotic or semi-automatic welding applications on thin gauge material, it is desirable to reduce the thickness of the material in order to lower the costs and weight of the welding components. As demonstrated, pure Ar shielding of metal-core wires reduces the arc penetration, making such welding process attractive for the robotic and semi-automatic applications.

Figure 8:
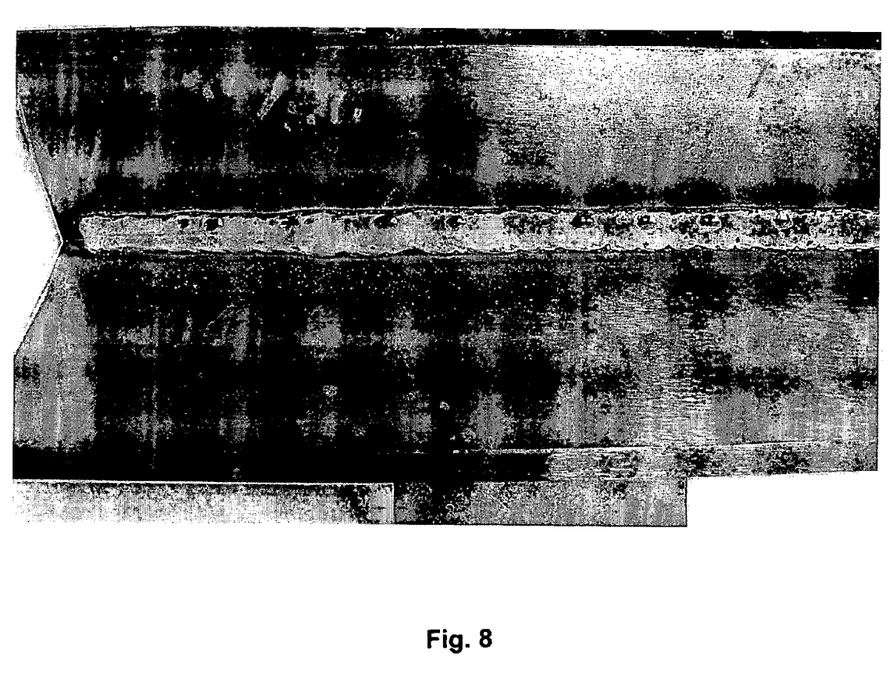
FIG. 8 is a front view of a metal-core wire weld made in 75% Ar/25% $CO_2$.
Figure 9:
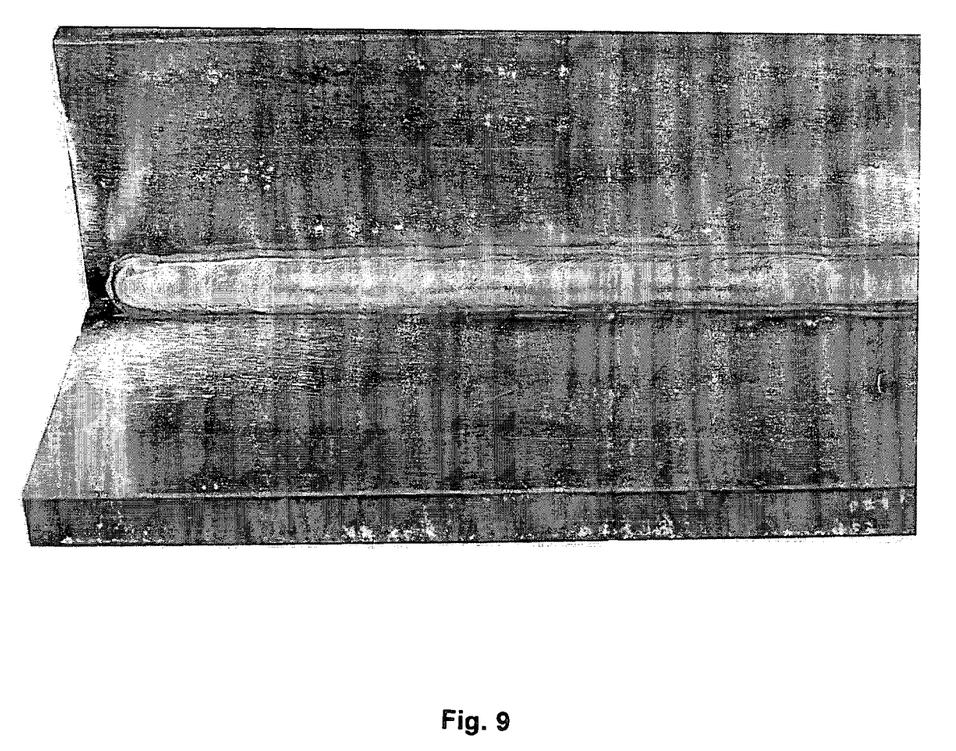
FIG. 9 is a front view of a metal-core wire weld made in pure Ar.
Figure 10:
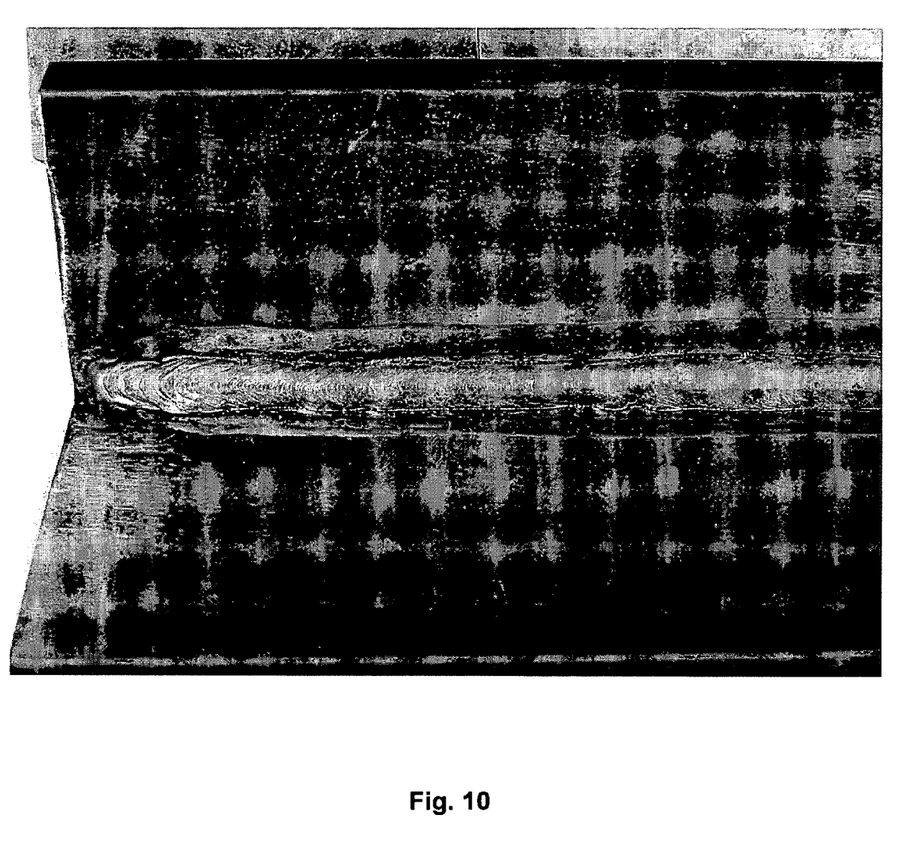
FIG. 10 is a front view of a solid wire weld made in pure Ar.

Test results shown in FIGS. 8-10 illustrate such benefits of the present invention as welding accompanying by reduced slag formation, cleaner welds and reduced spatter. The weld produced by welding a metal-core wire in the 75% Ar/25% $CO_2$ shielding shows slag and spatter, as can be seen in FIG. 8. The weld produced by welding a solid wire in the pure Ar shielding also shows even more slag formation and spatter. The cleanest weld was produced by welding a metal-core wire in the Ar shielding, as illustrated in FIG. 9.

Figure 11:
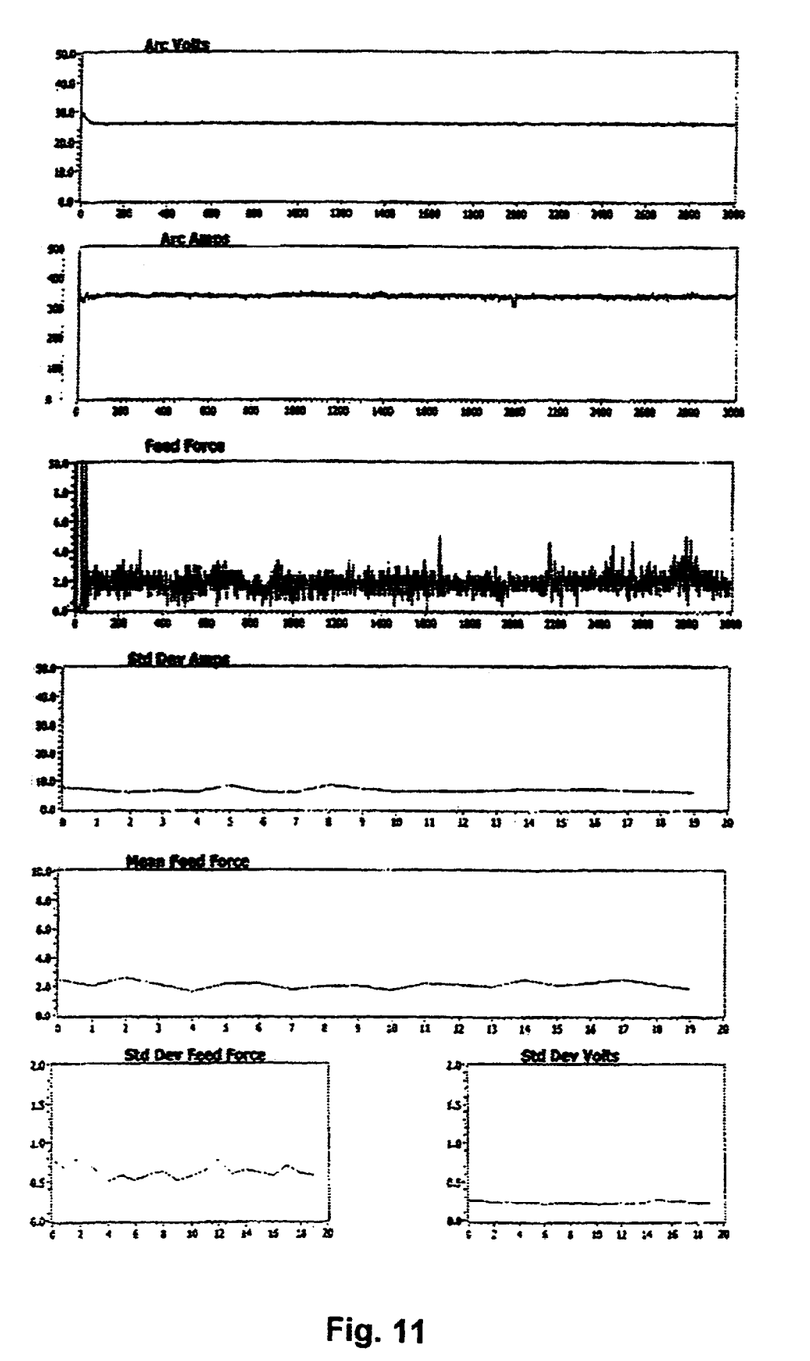
FIG. 11 shows the volt-ampere characteristics of the metal-core wire process.
Figure 12:
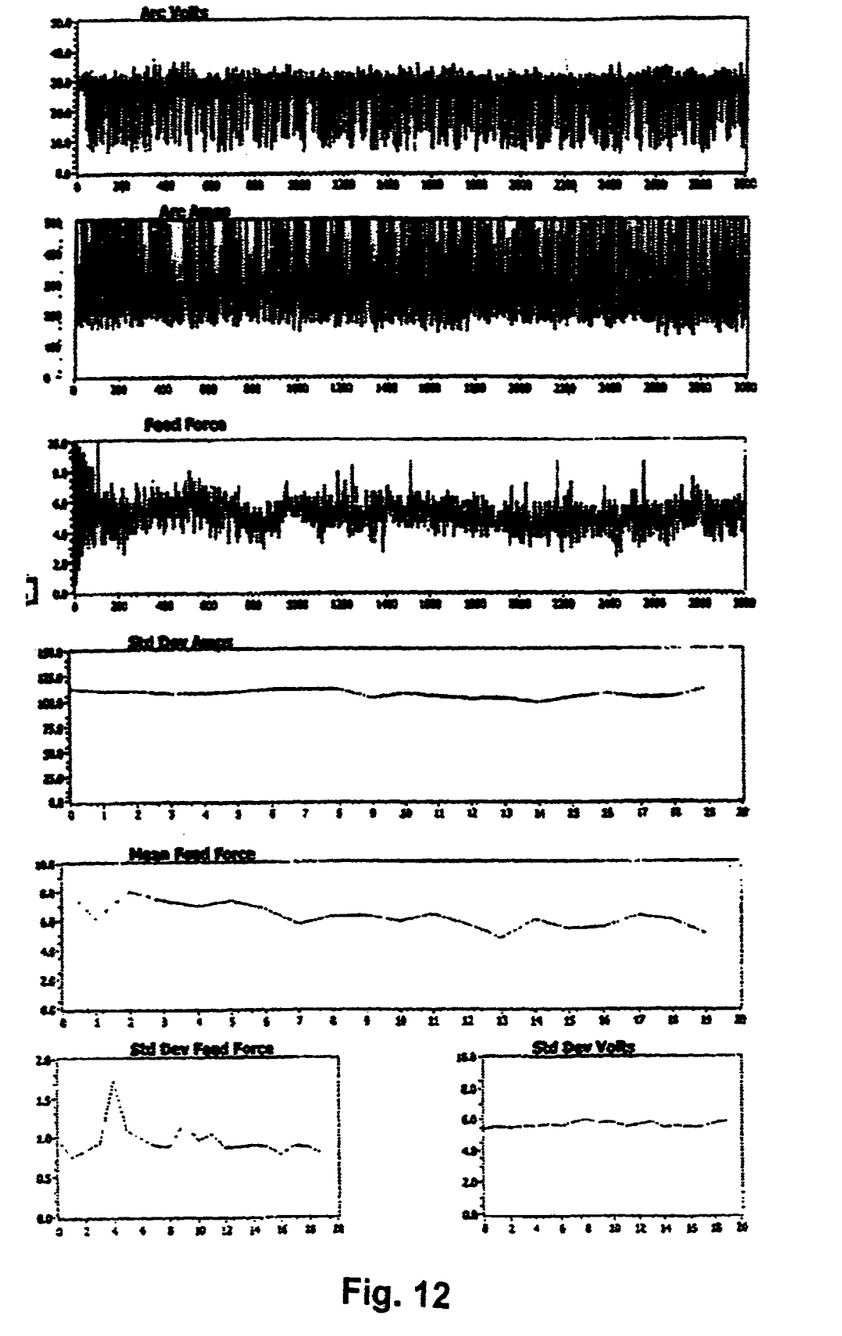
FIG. 12 shows the volt-ampere characteristics of the solid wire process.

It was also found that metal-core wires weld in pure Ar usually work at 2-5 Volts less than metal-core wires weld in the Ar/$CO_2$ mixture shielding atmosphere. Lower voltage consumption reduces the overall heat input during welding, further reducing the arc penetration and allowing one to weld thinner work pieces. Reduced heat input also means that the molten metal solidifies faster, allowing a welder to weld joints in a variety of welding positions than would have been possible at lower solidification rates. FIG. 11 illustrates the volt-ampere characteristics of the arc in the metal-core pure Ar welding process. FIG. 12 illustrates the volt-ampere characteristics of the arc in the solid wire 100% Ar process. The metal-core pure Ar process in FIG. 11 demonstrates a very stable arc with a standard voltage deviation ranging from about 0.2 to about 0.3 V, while the arc in the solid wire pure Ar process in FIG. 12 shows a very erratic arc with a much larger standard deviation (about 6 V).

Having described the invention in detail and be reference to specific embodiments thereof, it will be apparent to those of average skill in the art that numerous modification and variations are possible without departing from the spirit and scope of the invention.

What is claimed is:

1. A method for gas-metal arc welding of ferrous alloys comprising:
   feeding a consumable metal-core electrode into a gas-metal arc welding apparatus, the metal-core electrode having a sheath and a core characterized by a core composition;
   using Ar to form a non-oxidizing shielding atmosphere around the consumable metal-core electrode;
   igniting an arc between a ferrous alloy work piece and the consumable metal-core electrode to weld a carbon steel, low alloy steel or ferritic stainless steel work piece in the non-oxidizing shielding gas atmosphere and
   producing a weld metal comprising a percentage of oxygen in the weld metal not exceeding 0.06% wt.

2. The method of claim 1, wherein the non-oxidizing atmosphere of Ar comprises less than 1% of a residual amount of $N_2$, $N_2O_5$, $O_2$ or $CO_2$.

3. The method of claim 1, wherein the core comprises up to 45% wt of a metal powder and wherein an iron powder comprises up to 44% wt of the core composition.

4. The method of claim 1, wherein the core composition of the metal-core wire comprises oxygen.

5. A method for gas-metal arc welding of ferrous alloys comprising:
   feeding a consumable metal-core electrode into a gas-metal arc welding apparatus, the metal-core electrode having a sheath and a core characterized by a core composition;
   using Ar to form a non-oxidizing shielding atmosphere around the consumable metal-core electrode;
   igniting an arc between a ferrous alloy work piece and the consumable metal-core electrode to weld a carbon steel, low alloy steel or terrific stainless steel work piece in the non-oxidizing shielding gas atmosphere, wherein a fume generation rate does not exceed 0.25 gms/min.

6. A method for gas-metal arc welding of ferrous alloys comprising:
   feeding a consumable metal-core electrode into a gas-metal arc welding apparatus, the metal-core electrode having a sheath and a core characterized by a core composition;
   using Ar to form a non-oxidizing shielding atmosphere around the consumable metal-core electrode;
   igniting an arc between a ferrous alloy work piece and the consumable metal-core electrode to weld a carbon steel, low alloy steel or terrific stainless steel work piece in the non-oxidizing shielding gas atmosphere, wherein stability of the arc is characterized by a standard deviation within the range from about 0.2 V to about 0.3 V.

7. A method for gas-metal arc welding of ferrous alloys comprising:
   feeding a consumable metal-core electrode into a gas-metal arc welding apparatus, the metal-core electrode having a sheath and a core characterized by a core composition;
   using Ar to form a non-oxidizing shielding atmosphere around the consumable metal-core electrode;
   igniting an arc between a ferrous alloy work piece and the consumable metal-core electrode to weld a carbon steel, low alloy steel or terrific stainless steel work piece in the non-oxidizing shielding gas atmosphere, wherein a toughness of a weld metal at 0 F of at least about 50 ft-lb at 0° F. and at least about 41 ft-lb at −20° F.

* * * * *